United States Patent Office 2,861,003
Patented Nov. 18, 1958

2,861,003

NAPHTHA SUSPENSION OF UNREFINED WAXY RESIDUE

Kenneth L. Waite, Milwaukee, Wis.

No Drawing. Application January 12, 1955
Serial No. 481,487

6 Claims. (Cl. 106—271)

This invention relates to improvements in compositions for coating and impregnating fibrous material such as wood and textiles, to make such materials water-resistant and to provide surfaces thereon to which dust, mud, lint and the like will not adhere.

Plywood is used in large quantities for many purposes where it is subjected to water and particularly as forms for concrete. When used in forms for concrete, it is necessary that the plywood be coated and impregnated to some extent with a material which will resist water penetration, which will avoid transfer of the wood grain to the concrete, which does not affect wood cutting tools, which does not caust dermatitis to workmen, and which is not disagreeable to handle. The coating and impregnant should be applicable to the plywood by brushing, spraying, or dipping without special care or precautions, should be low in cost and one application should be sufficient to allow the same plywood panel to be reused a number of times without recoating. The coating must resist the alkalinity and all other chemical or physical actions of a concrete mix. Only a wax composition employing the hard waxes such as carnauba or candelilla would meet all the above requirements but the supply of such waxes is too small, and their cost is too high to allow use thereof for coating or impregnating material such as plywood or cloth such as canvas.

An object of the present invention is therefore a coating and impregnant for natural fibrous materials, in which the essential ingredient is a waxy material.

Another object of the invention is a waxy suspension in a volatile vehicle and which can be applied to plywood in any manner without raising the grain of the wood and in which one coating makes the plywood resistant to water.

Another object of the present invention is a composition having an unrefined waxy residue from the distillation of the petroleum as one of its major components and in which the material is put into suspension in a volatile vehicle by a process retaining substantially all of the components of the residue.

Another object of the invention is a suspension of an unrefined waxy petroleum distillation residue in a volatile vehicle in a manner producing a high degree of permanence of the suspension and in which the waxy material is readily re-disposed, with little agitation, throughout the vehicle even after long storage.

Another object of the invention is a suspension of an unrefined residue from the distillation of petroleum, in a volatile hydrocarbon vehicle and with an agent for increasing permanence of the suspension and for eliminating any stickiness or tackiness of the applied coating.

Generally, the present composition employs a waxy material which is the "bottoms" residue remaining in a still after distillation of the volatile portions of petroleum. The "bottoms" or residue is a varying composition of a wax or mixture of waxes with other petroleum residues of which some are acidic in nature. The residue from the still is used in the present composition, in its unrefined form as any refining removes materials necessary to achieve the properties and final results desired of the present composition.

The vehicle in which the waxy material is suspended is a volatile hydrocarbon which does not raise the grain of the wood or leave greasy residues upon evaporation. It has been found that some of the volatile hydrocarbons raised the grain of plywood when used in the present composition and that the lower volatility hydrocarbons such as gasoline leave residues which prevent formation of a dry and hard coating, the groups of petroleum distillates including the fractions known as naphthas having chemical and physical properties which avoid the disadvantages of the groups of hydrocarbon solvents mentioned above and leave a coating and impregnation which differs only slightly to touch from the touch sensation of the original plywood or cloth. Hence, the vehicle preferred is one of the several groups of naphthas and is preferably one of the grades known as "V M & P" naphthas.

For some conditions of storage and use, a dispersant may be used, which inhibits coalescence of the waxy material and any tendency of the composition to separate into a wax-containing layer and a layer of the volatile vehicle. However, if the unrefined wax residue and a preferred naphtha are used and compounded as herein described, the composition has so little tendency to separate that specimens standing for several months show a clear layer of vehicle of only approximately one-half of one percent of the height of the specimen. However, when a siloxane is used having viscosity of that preferred in the final product, a coating is obtained which is so dry and hard as to be suitable as the coating and polish for finished surfaces such as walls of plywood, cut lumber and peeled or turned logs.

The composition consists essentially of one part by weight of the unrefined waxy petroleum still residue to six parts by weight of a petroleum distillate of either a group of naphthas or a group including benzol, as identified below.

The waxy residue is tan to dark brown in color (almost black in some instances) and has a slight odor somewhat resembling turpentine. The material is so tough and sticky that it cannot be cut with a knife. Its fracture resembles that of hard waxes in that there are numerous small "chips" partially free from the mass but strongly adherent along their unsevered portion.

The waxy material from one group of refineries has a sp. g. of 0.88–0.93 and melting point of 130–190° F. At 210° F. the viscosity is 55–105 by the Saybolt Universal viscosimeter. A flash point of 400–550° F. and a firepoint of 450–600° F. are found with a Cleveland open cup. The neutralization value is below 0.25 mg. and the saponification value is 2.5 mg. potassium hydroxide per gram of waxy residue. The iodine value is below 5. As is true of any unrefined byproducts of natural materials, the values obtained in the above tests differ dependent on the source of the material and the processing to which the material is subjected in recovering the main products.

The vehicle may be one of several groups of petroleum distillate which are herein identified by numbers inasmuch as the names now commercially used for the various distillate are not standardized. However, the first group includes the V M & P naphthas and the second group begins with benzol.

| | Sp. G. 60° F., Am. Petrol. Institute | Weight per gal., lbs. | Flash Point, ° F., T. C. C. | Drying Time sec. | Drying Time min. | Kauri butanol Value |
|---|---|---|---|---|---|---|
| 1 | 58.0 | 6.216 | 10 | 40 | | 43.0 |
| 2 | 56.4 | 6.270 | 20 | 20 | 1 | 39.2 |
| 3 | 55.6 | 6.296 | 53 | 32 | 1 | 38.6 |
| 4 | 52.5 | 6.402 | 102 | 40 | 7 | 31.5 |
| 5 | 47.5 | 6.582 | 104 | 35 | 11 | 46.0 |
| 6 | 47.6 | 6.578 | 110 | 25 | 11 | 38.0 |
| 7 | 52.5 | 6.402 | 102 | 7 | 40 | 31.5 |
| 8 | 52.3 | 6.410 | 111 | 40 | 11 | 31.2 |
| 9 | 51.2 | 6.448 | 118 | 30 | 12 | 30.5 |
| 10 | 49.2 | 6.520 | 118 | 30 | 12 | 34.3 |
| 13 | 29.0 | 7.341 | 20 | 36 | | 113.2 |
| 14 | 31.5 | 7.228 | 42 | 5 | 1 | 105.0 |
| 15 | 37.4 | 6.976 | 40 | 2 | 1 | 89.0 |
| 16 | 31.7 | 7.219 | 81 | 30 | 2 | 97.0 |
| 17 | 32.2 | 7.198 | 81 | 28 | 2 | 94.2 |
| 18 | 31.1 | 7.246 | 107 | 55 | 7 | 85.6 |
| CCl | | 11.135 | none | 25 | | 106.0 |

The above flash point determinations were made by the Tag closed cup method according to the American Society for Testing Materials procedure. The drying time is in terms of minutes required for evaporation of ½ cc. of the distillate from 6 inch filter paper at 75° F. ambient temperature. The drying time values necessarily vary according to ambient temperature, humidity and barometric pressure and are only a comparative guide.

The preferred composition is essentially:

Unrefined waxy petroleum still residue, 1–2 lbs.
Naphtha of flash point 10–118° F., 6 lbs. (1 gal.).

Any volatile hydrocarbon may be used but the naphthas have been found preferable, it being necessary only that the flash point be from 10–118° F., which includes those used by varnish-makers and painters and known as V M & P naphthas.

If a product is desired which will remain in suspension form indefinitely and where even slight oily residue is objectionable, a polymethyl siloxane may be added. The siloxane is preferably 100 to 500 centistokes viscosity (25° C.) and the quantity used is 1 to 5% by weight of the waxy material. It is believed that the effect of the siloxane is to aid in coating the particles of waxy material in the final suspension and in keeping particles separated. The siloxane also appears to aid in forming a continuous coating without leaving "bare" areas when the brushing or spraying is done without adequate care. Other dispersants may be used provided they are completely miscible with the vehicle, stable at the compounding temperatures, wholly inert and do not leave objectionable residues on the coated surfaces.

The process of compounding includes a number of factors which must be observed if a satisfactory product is to be obtained. First, the waxy material is heated to 200–220° F. at which time it is a highly mobile liquid. The V M & P naphtha is placed in a vessel at room temperature or lower and preferably at not more than 65° F. to minimize evaporation of the naphtha. The vessel is equipped with a stirrer capable of violently agitating the vessel contents, the stirrer preferably being of the type having several interacting blades to obtain a blending or homogenizing action. The agitator is started and the melted waxy material is poured rapidly into the naphtha. It is preferred that the pouring be done as rapidly as possible to secure mixture of all of the naphtha and the waxy material without losing a substantial amount of heat from the waxy material and to aid the agitator in avoiding localized heating of the naphtha.

The entire mixture is then heated up to 140–150° F. while the agitator is kept running, for 30–60 minutes. The mixing has reached the end point when the mixture appears to be homogeneous throughout, that is without visible lumps or color differences. Heating is then interrupted but agitation is continued until the product cools to room temperature and at least to 85° F., which increases the permanence of the final suspension and facilitates remixing to homogeneous condition of product which has been stored for a long time.

It is believed that the melted waxy material is quickly distributed throughout the vehicle and is broken into sub-microscopic particles by the beater blades. The dispersion of the solid in the vehicle is very complete because the flash point of a final product is 54–58° F., whereas, the flash point of the vehicle used is 35° F. The product has been successfully used as close as 3–4 feet to an open flame, in open air.

The product is a suspension which does not "break" in even several months standing and which is considerably lighter in color than the waxy material in either its solid or liquid state. The suspension has the consistency of a thin cream which is readily applied with a brush or broom or by a sprayer at low pressure (35 pounds). The final product has a closed cup flash point of 54–57° F. dependent on the properties of the waxy residues used and a fire point of approximately the above temperature (Cleveland open cup method). When a container is opened there is a distinct odor of naphtha but the odor diminishes as the material is used. There is less odor from the container if the mixture is thoroughly shaken or stirred. Bubbles of air shaken or stirred into the mixture are harmless even though such bubbles remain in the mixture at substantially their original position.

The present product does not affect the bond between plies of wood and does not act on the wood itself to cause deterioration thereof as is true of the oils now sold for coating plywood concrete forms. The acidic components of the waxy residue resist the alkali in the concrete so that a coating of the present composition does not break down and become ineffective. Important factors in the success of the present product are the smoothness of the coating which resists plywood handling abrasion and otherwise protects the surface. The present product also seals the edges (as well as the faces) of the panel of plywood and prevents moisture penetration at the edges. Avoidance of "wood grain" on the concrete eliminates the hand labor of rubbing down the concrete surface which would otherwise be marred, and there is no staining of concrete as frequently occurs with other coatings. The present product is equally effective on new or used plywood, even when the plywood was previously coated with an oil. The only requirements are that the plywood be dry and free from dirt which would mar the concrete surface. When applied at low temperatures, the product is thinned as required by addition of naphtha with moderate stirring.

It is to be especially noted that a wax or waxy material is only one of the constituents of unrefined petroleum still bottoms residues. When such material is even partially refined, some of the constituents are lost and the waxy mass remaining will not act in the same way as the unrefined material. If naphtha is removed from the present final product and an attempt is made to redisperse the balance, the result is a lumpy mass which will not remain in suspension but quickly settles to the bottom of a container. Hence, the present product is not merely a suspension of a wax in a volatile vehicle and is restricted to the unrefined waxy residues from the distillation of petroleum.

I claim:

1. An impregnating and coating composition for treating fibrous material and consisting essentially of one part by weight of waxy residue in the distillation of wax-containing petroleum and having a melting point of 130–190° F., and six parts by weight of a petroleum distillate of a group having a closed cup flash point of 10–118° F. and a drying time below 15 minutes, the distillate being a volatile vehicle and leaving the waxy material as a coating dry to touch.

2. A suspension for impregnating and coating fibrous material and consisting essentially of 1 to 2 pounds of unrefined waxy residue in the distillation of wax-containing petroleum and having a viscosity at 210° F. of 55–105 Saybolt, and 1 gallon of a volatile vehicle of a petroleum distillate group having a closed cup flash point of 10–118° F. and a drying time below 15 minutes, the distillate being a volatile vehicle and leaving the waxy material as a coating dry to touch.

3. A substantially permanent and readily dispersible suspension for impregnating and coating fibrous material and consisting essentially of 1 to 2 pounds of unrefined waxy residue in the distillate of petroleum and having a melting point of 130–190° F., and 1 gallon of one of a group of naphthas having a closed cup flash point of 10–118° F. and a drying time below 15 minutes, the distillate being a volatile vehicle and leaving the waxy material as a coating dry to touch.

4. A suspension for impregnating and coating natural fibrous material and consisting essentially of 1½ pounds of unrefined waxy residue of petroleum after completion of distillation of the petroleum and having a viscosity at 210° F. of 55–105 Saybolt, and 1 gallon of a naphtha of the group having a flash point of 10–118° F.

5. A suspension for impregnating and coating a natural fibrous material and consisting of 1–2 pounds of unrefined waxy residue of petroleum after completion of the distillation of the petroleum, the waxy residue having a melting point of 130–190° F., 1 gallon of a volatile hydrocarbon having a flash point of 10–118° F., and a dispersant inert to the residue and the naphtha and completely miscible in the naphtha, the dispersant being a quantity sufficient to make a substantially permanent and readily re-dispersable suspension.

6. A suspension for impregnating and coating a natural fibrous material and consisting of 1½ pounds of unrefined waxy residue of petroleum after completion of distillation of the petroleum, the waxy residue having a melting point of 130–190° F. and a viscosity at 210° F. of 55–105 Saybolt 1 gallon of a naphtha of the group having a flash point of 10–118° F., and a poly methyl siloxane of 100–500 centistokes viscosity at 25° C. and in the proportion of 1–5% of the weight of the residue.

References Cited in the file of this patent

UNITED STATES PATENTS

| | | |
|---|---|---|
| 295,525 | De Nise | Mar. 25, 1884 |
| 349,172 | Nichols | Sept. 14, 1886 |
| 1,256,710 | McAdams | Feb. 19, 1918 |
| 1,570,138 | Gat | Jan. 19, 1926 |
| 1,986,936 | Lewers | Jan. 8, 1935 |
| 2,118,521 | Pickens | May 24, 1938 |
| 2,523,281 | Currie | Sept. 26, 1950 |
| 2,676,893 | Budner | Apr. 27, 1954 |

FOREIGN PATENTS

| | | |
|---|---|---|
| 24,853 | Australia | of 1935 |

OTHER REFERENCES

The Chemistry and Technology of Waxes, Warth (1947), p. 237.

Bennett: "Commercial Waxes" (1956), page 25.